E. YERBY.
Butter Worker.
No. 21,042. Patented July 27, 1858.
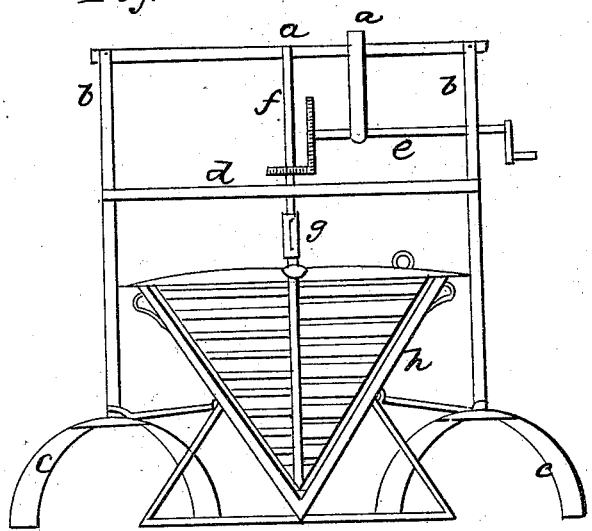
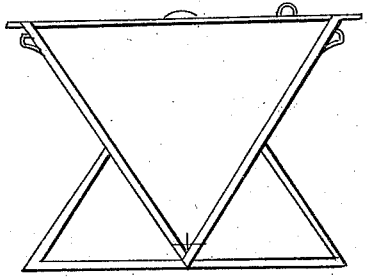
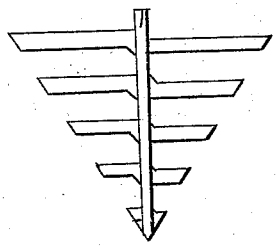
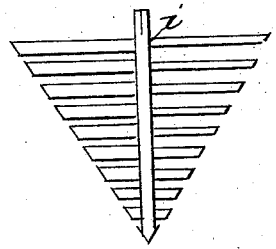
WITNESSES
INVENTOR

UNITED STATES PATENT OFFICE.

E. YERBY, OF WASHINGTON, DISTRICT OF COLUMBIA.

BATTER-MACHINE.

Specification of Letters Patent No. 21,042, dated July 27, 1858.

*To all whom it may concern:*

Be it known that I, ELLYSON YERBY, of Washington, District of Columbia, have invented a new and useful Machine for the Manufacturing of All Kinds of Batter and for Churning Butter, and will call it a "batter and butter manufacturing machine;" and I do hereby declare that the following is a full, clear, and exact description of the construction and operation of the same, reference being had to the annexed drawings, making a part of this specification, in which—

Figure 1 is a perspective view; Fig. 2 the two half sections of a transverse conical batter beater, Fig. 3 showing one side of a flat surfaced conical butter beater or agitator, Fig. 4 a conical batter pan or churn.

This machine consists simply of a cap or head piece, (*a*), two upright side timbers (*b b*) which connect with (*a*) above, and with the feet (*c c*) below.

(*d*) is the brace between the head and feet. (*e*) is the horizontal shaft, wheel and crank.

(*f*) is the perpendicular shaft and wheel extending from the cap downward through the brace to within one inch of the bottom of the feet. About one third of the whole length of this shaft at the lower end is detached, to which is attached either of the beaters or agitators by a piece of sheet iron inserted and made permanently fast in the lower end of the upper part of the shaft, and projects about half its length out of the shaft. This has an incision made in it, by which the lower end or detached part of the shaft (to which is attached the agitator or beater); is connected by means of a pin passing through an incision made to receive the lower end of the piece of sheet iron which projects from the upper part of the shaft at the lower end.

(*g*) is a slide made of metal and is used to make secure the two detached parts of the shaft. This shaft is detached, so that after using the machine you can remove the pan without difficulty by slipping up the slide and disconnecting the agitator or beater which will be left in the pan.

(*h*) is the pan and is thus constructed. The pan itself is conical, the lower end or point having from one to one and a half inches depth of lead cast into it, in the exact center of which there is a spindle projecting through the lead from the outer side of the pan about one inch long, on which the perpendicular shaft turns, keeping the agitator perfectly steady. About the center of the length of the pan the base or bottom is connected and is brought down over or nearly so with the point of the pan and is nearly of the same diameter as the pan at top. The pan is attached to the perpendicular timbers by means of two hooks each passing through a loop attached to the pan about the connection of the pan and its base or bottom. (*i*) is a butter agitator or beater and is also conical shaped its two sides being flat.

What I claim as my invention and desire to secure by Letters Patent is—

The peculiar construction of the pan and the agitators or beaters their construction being such as to manufacture the ingredients for a pound cake (into batter) in twenty minutes, from breaking the first egg till the batter is in prime condition to be baked and that without any artificial helps to procure lightness of batter. The eggs and sugar are first put into the pan and beaten about five minutes, then add your butter, then beat about three minutes then add your flour as required which will insure in twenty minutes a good cake. The machine will beat so small a quantity as a single egg and from that to any quantity that the pan will contain, it will also churn butter in ten minutes. These experiments have been tested by the inventor and others.

ELLYSON YERBY.

Attest:
JOHN S. HOLLINGSHEAD,
P. M. BYFER.